United States Patent [19]

Vatter

[11] Patent Number: 4,752,539

[45] Date of Patent: Jun. 21, 1988

[54] BATTERY HOLDER FOR ELECTRONIC APPARATUS

[75] Inventor: William K. Vatter, Springfield, Ohio

[73] Assignee: Spectra-Physics, Inc., San Jose, Calif.

[21] Appl. No.: 913,827

[22] Filed: Nov. 10, 1986

[51] Int. Cl.[4] .................. H01M 2/00; H01M 2/10
[52] U.S. Cl. ............................. 429/1; 429/97; 429/98; 429/100; 220/348; 220/351
[58] Field of Search .......... 429/1, 121, 96-100; 339/152; 220/348, 351

[56] References Cited

U.S. PATENT DOCUMENTS

| 954,119 | 4/1910 | Mason | 429/97 |
|---|---|---|---|
| 964,687 | 7/1910 | Patterson | 429/1 |
| 2,295,747 | 9/1942 | Mills | 220/351 |
| 2,479,592 | 8/1949 | Tomczak | 220/351 |
| 2,590,804 | 3/1952 | Vitale | 429/97 |
| 2,731,586 | 1/1956 | Born | 317/99 |
| 3,181,974 | 5/1965 | La Barbera | 136/173 |
| 3,537,909 | 11/1970 | Horton | 136/173 |
| 3,864,172 | 2/1975 | Marks | 429/1 |
| 3,881,961 | 5/1975 | Nation | 136/173 |
| 4,075,402 | 2/1978 | Okamoto | 429/98 |
| 4,113,098 | 9/1978 | Howard | 220/351 X |
| 4,129,688 | 12/1978 | Fischer et al. | 429/97 |
| 4,138,531 | 2/1979 | Thompson | 429/98 |
| 4,468,439 | 8/1984 | Ohara et al. | 429/1 |
| 4,637,965 | 1/1987 | Davis | 421/1 |

OTHER PUBLICATIONS

U.S. Application Ser. No. 788,800, Filed 10/18/85-Assignee: Spectra-Physics, Inc., Inventor: Joseph Rando et al.

Primary Examiner—Brian E. Hearn
Assistant Examiner—Stephen J. Kalafut
Attorney, Agent, or Firm—Quarles & Brady

[57] ABSTRACT

A receiver for a laser transmitter for use in surveying, comprising a housing and a sensor module pivotably mounted on the housing so that, by pivoting the sensor module relative to the housing, the device can detect a laser signal coming from sources at various angles to the housing. Also, a battery receptacle comprising a housing which defines a cavity and an opening at one end of the cavity for receiving a battery. First and second recesses are formed at the other end of said cavity and are shaped to receive terminals on a battery which is inserted in the cavity. First and second electrically conductive springs are mounted in the first and second slots, respectively. A door is mounted on the housing to close the opening and to retain a battery in the cavity.

5 Claims, 2 Drawing Sheets

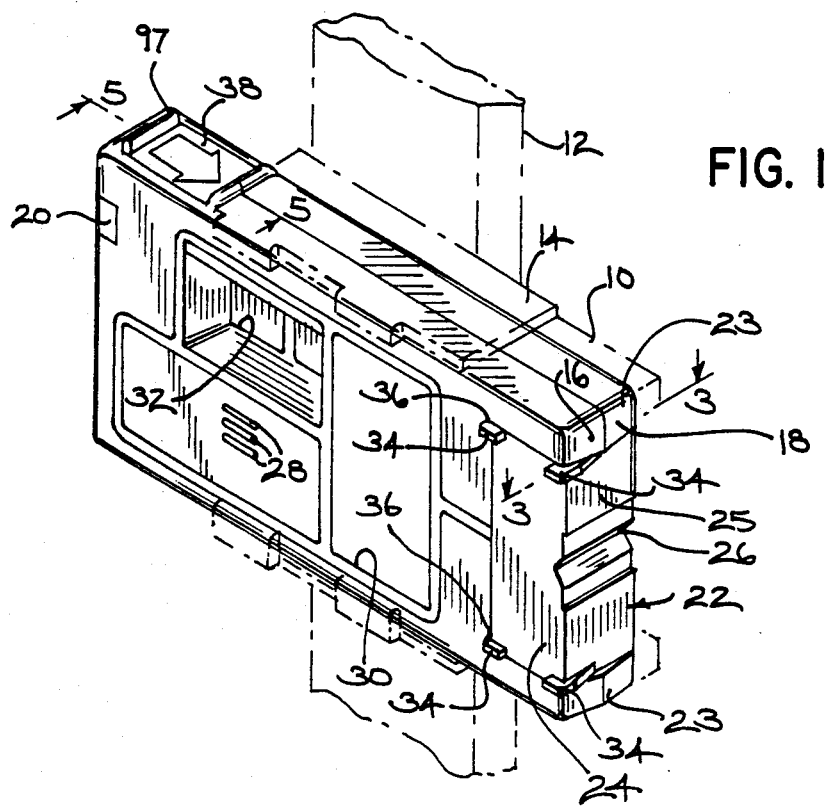
FIG. 1
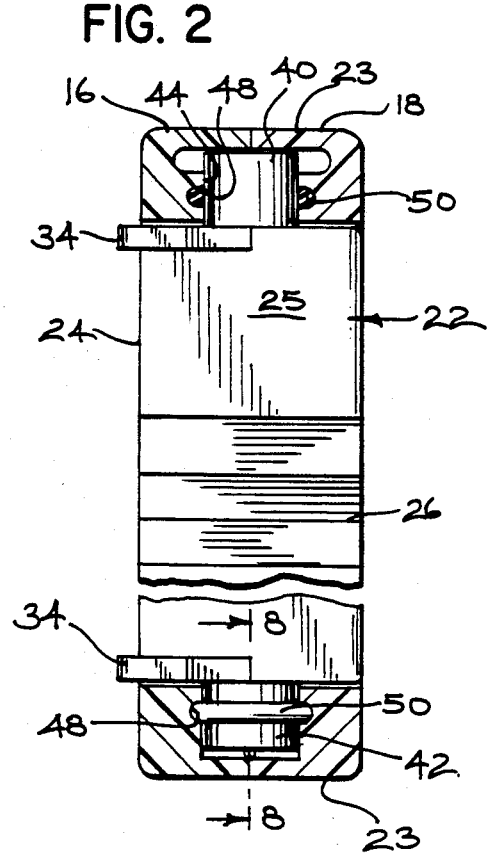
FIG. 2
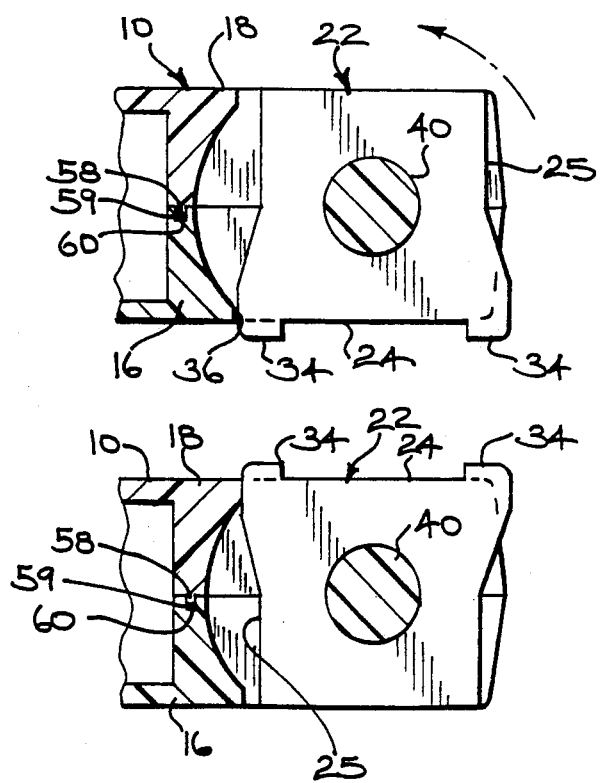
FIG. 3
FIG. 4

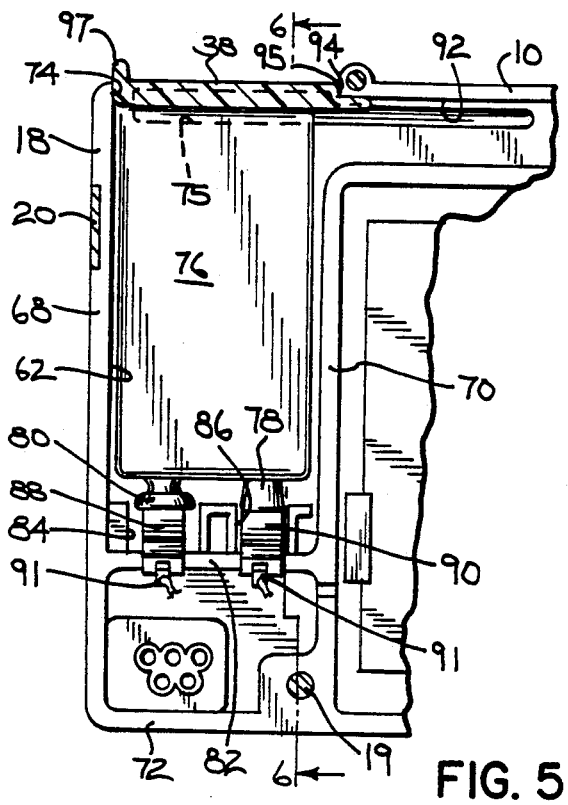
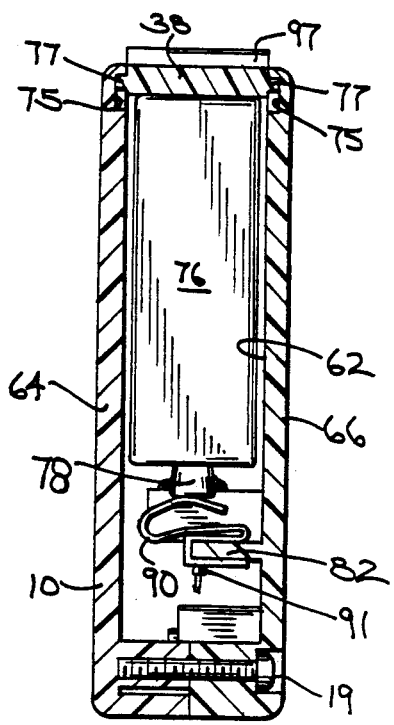
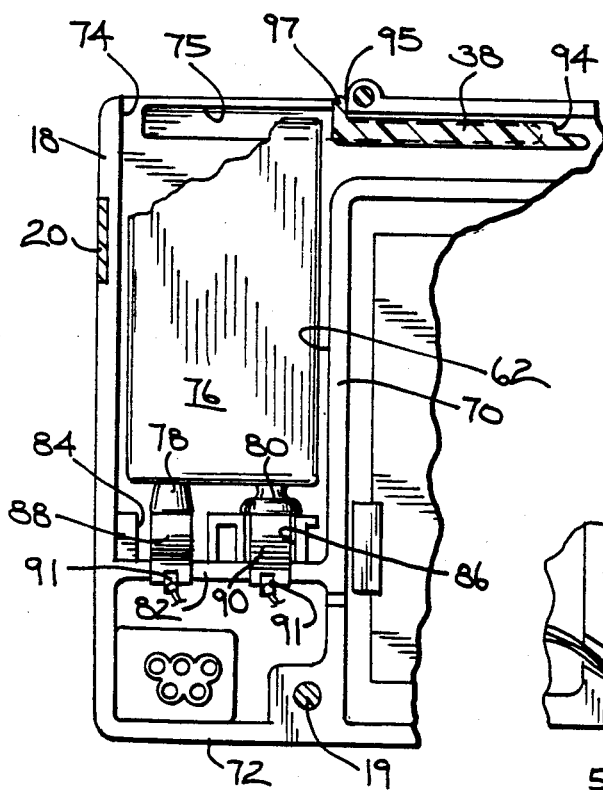
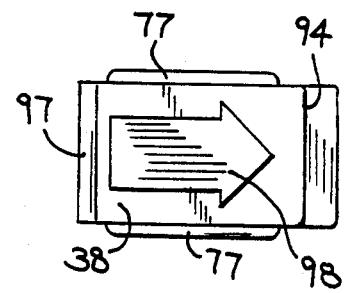
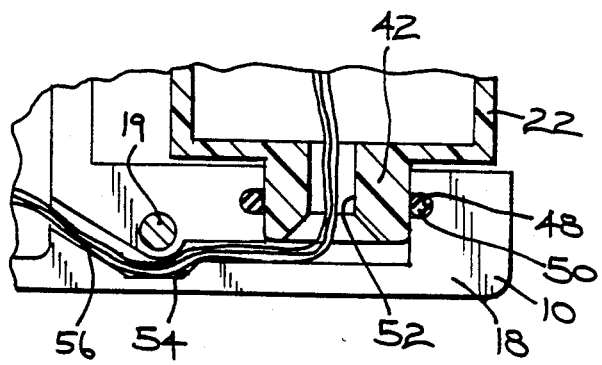

BATTERY HOLDER FOR ELECTRONIC APPARATUS

BACKGROUND OF THE INVENTION

The field of the invention is portable, battery powered electronic equipment and, more particularly, remote receivers for laser alignment systems.

Laser alignment systems are well-known in the industry, primarily for use at construction sites. One such system has been described, for example, in U.S. application Ser. No. 788,800, filed Oct. 18, 1985, entitled "Self Levelling Transmitter For Laser Alignment Systems". In a typical application, a central transmitter projects laser light in a precise alignment cone extending 360° around the transmitter. One or more receivers, including photocell detectors, are then used throughout the area to detect the alignment cone of light and indicate whether the receiver is above, below, or on the alignment cone.

The remote receiver may be battery powered and may be held by hand or mounted on a pole or on an existing structure such as a building. If the receiver is mounted on a pole or other structure, the structure may create a shadow which obstructs the light from the laser transmitter. This creates a problem in that the receiver must be moved (and perhaps mounted on another structure) in order to be directed in the direction of the transmitter. The requirement of moving the receiver in order to get an unobstructed reading impairs the usefulness of the equipment.

Also, in any portable electronic equipment, the battery must be replaced regularly. In a typical 9-volt battery compartment, the battery terminals are press fitted into mating terminals carried by a plate which is connected by wires to the housing of the electronic device. In order to insert a battery, the plate containing the terminals must be fished out of the housing, pulling the wires out so that they extend out of the housing; the battery is pressed into the mating terminals; and then the wire and battery are all pushed back into the housing. This arrangement is undesirable for several reasons. The wire leads dangling out of the housing are a nuisance, can be severed or pulled loose from the housing, and generally create opportunities for failure. In addition, the manufacture of such an electronic apparatus includes a substantial amount of labor necessary for soldering the wires to the terminals, to the housing, and so forth. Also, the door which typically covers the battery compartment is a separate member which somehow clips onto the housing. Such doors are easily lost, leaving the battery compartment open, which is undesirable.

SUMMARY OF THE INVENTION

An object of the present invention is to provide a portable receiver for a laser alignment system in which the photocell detector module of the receiver is rotatably mounted with respect to the receiver housing, so that the receiver housing may be fixed to a pole or other stationary structure, and the orientation of the sensor may then be changed in order to move the detector out of the shadow of the pole or other structure.

Another feature of the invention is that the enclosure around the photocell defines a notch so that the surveyor can easily mark the point of the alignment cone defined by the transmitter.

The present invention provides a surveying device comprising a housing and a sensor module pivotably mounted on the housing so that, by pivoting the sensor module relative to the housing, the device can detect a laser signal coming from sources at various angles to the housing.

In addition, the present invention provides a simple, efficient battery receptacle which eliminates the problems of the loose wires and loose doors of the prior art, while providing a positive, secure fit of the battery terminals with the terminals of the housing. The fit of the battery in the housing ensures that the battery does not move appreciably relative to the housing once the battery is installed and the door shut. It also ensures good electrical contact between the battery and the housing and ensures that the battery cannot be installed with the wrong polarity.

The battery receptacle of the present invention is also easier to manufacture than receptacles of the prior art.

The present invention provides a battery receptacle comprising a housing which defines a cavity and first and second recesses opening into the cavity. First and second electrically conductive springs are mounted in the first and second recesses, respectively. The housing defines an opening opposite the recesses so that a battery can be received into the cavity through the opening. A door is mounted on the housing and is adapted to close the opening to retain a battery in the cavity.

BRIEF DESCRIPTION OF THE DRAWINGS

FIG. 1 is a perspective view of the Level Detector Housing of the present invention, with a pole and clamp in phantom to show how the housing could be clamped to a pole in the field;

FIG. 2 is an enlarged end view of the housing in FIG. 1 with the portions above and below the sensor enclosure in section and the sensor enclosure partially broken away;

FIG. 3 is a view along the section 3—3 of FIG. 1;

FIG. 4 is the same view as FIG. 3, with the sensor portion of the housing rotated 180° from the position in FIG. 3;

FIG. 5 is a view taken along the section 5—5 of FIG. 1, showing the battery compartment with the rest of the housing broken away;

FIG. 6 is a view along the section 6—6 of FIG. 5;

FIG. 7 is the same view as FIG. 5, except the battery is partially broken away and the battery terminals are reversed;

FIG. 8 is a broken away view along the section 8—8 of FIG. 2; and

FIG. 9 is a top view of the sliding door removed from the housing.

DESCRIPTION OF THE PREFERRED EMBODIMENT

The following description refers to FIGS. 1-9 which show a preferred embodiment of the invention. FIG. 1 shows the level detector housing 10 mounted on a pole 12 by means of a clamp 14. The main body of the housing 10 is made up of two shell halves 16, 18, which are held together by means of screws 19 (shown in FIGS. 5, 7, and 8) and by means of a clip 20. The photo-sensors (not shown) are located inside the sensor module 22, which pivots relative to the rest of the housing 10. The light receiving face 24 of the pivoting portion 22 is transparent to the type of laser light that is transmitted by the transmitter (not shown). The side 25 defines a notch 26 which shows the position of the reference cone of laser light once the level detector indicates that it is aligned on the reference cone. The housing 10 has a number of holes 28, 30, 32 in its outer surface, which may be used for providing readouts, such as LCD displays or even for emitting sounds indicating whether the detector is above the reference cone, below the reference cone, or on the cone. The housing 10 also includes a sliding door 38, seen in FIGS. 1, 5-7, and 9, which slides into a pocket 92 in the housing 10 in order to open a battery receptacle cavity 62 in the housing 10.

The sensor module 22 is mounted between two arms 23 of the main housing 10 as can be seen in more detail in FIGS. 2-4. The sensor module 22 includes two stub axles 40, 42. These fit into corresponding recesses 44, 46 in the arms 23 of the housing 10. Each recess 44, 46 includes an annular indentation 48, which receives an O-ring 50 that has been placed over its respective stub axle 40, 42. When the sensor module 22 is pivoted, the O-rings 50 tend to stay fixed on their respective stub axles 40, 42, and the surface between the O-ring and the housing becomes the bearing surface for the pivoting motion. It can be seen in FIGS. 3 and 4 that the cross-section of the sensor module 22 is square, and the sensor module 22 pivots about an axis running through the center of the square.

As best seen in FIG. 8, the lower stub axle 42 is hollow and defines an opening 52 which opens to the outside of the stub axle 42. It is through this opening 52 that wiring 56 from the sensors in the sensor module extends in order to reach into the body of the housing 10. It will be noted in FIG. 8 that a groove 54 is provided below the lower stub axle 42 and extends into the main body of the housing 10 to permit the wiring 56 to reach the housing 10 from the pivoting portion 22.

It will also be noted in FIGS. 3 and 4 that the shell halves 16 and 18 define a mating projection 58 and recess 60, which extend substantially around the perimeter of the shell halves to ensure that the halves are properly aligned for assembly. An O-ring cord seal 59 is located between the mating projection 58 and recess 60 and extends around the shell halves 16, 18 to ensure a good seal between the halves 16, 18.

The sensor module 22 also includes ears or projections 34, which serve as stops to limit the rotation of the pivoting portion 22 to a sweep of 180°. The notches 36 in the main body of the housing 10 stop the ears 34 at the point of contact. From the position shown in FIGS. 1 and 3, the light receiving face 24 can rotate 180° in the counter-clockwise direction as shown in FIG. 4. If the pivoting portion 22 were allowed to rotate freely relative to the housing 10, the wiring extending from the pivoting portion 22 into the housing 10 could become tangled and even damaged.

The purpose of pivoting the sensor module 22 relative to the rest of the housing 10 is to permit the light receiving face 24 to be directed toward the laser source. If the detector housing 10 is mounted on a pole or a wall which casts a shadow or is otherwise mounted so that the sensors are not directed toward the transmitter, the rotating portion 22 may be rotated to get out of the shadow and to face the transmitter.

The battery cavity 62 can be seen best in FIGS. 5-7. This part of the housing includes front and back walls 64, 66; side walls 68, 70; and an end wall 72. The opposite end 74 is open. The battery 76, which is located in the battery compartment 62, is a standard 9-volt battery having male (positive) and female (negative) terminals 78, 80 projecting from one surface of the battery. (The terminals 78, 80 are referred to as male and female terminals due to their shape and the manner in which they are usually connected to electrical devices. However, it will soon be obvious that both the positive and negative terminals 78, 80 are received as male terminals in the present construction.) The battery compartment 62 also includes a partition 82 near the end wall 72 which serves as the end of the battery compartment 62. The partition 82 extends from the wall 66 half-way toward the wall 64 and defines two parallel slots (or recesses) 84, 86 opposite the opening 74, with the slot 84 being wide enough to receive the female terminal 80, and the slot 86 being wide enough to receive the male terminal 78, but narrow enough that it will not receive the wider female terminal 80. The difference in width in the slots 84, 86 assures that the battery 76 can only be inserted with the correct polarity.

Electrical contacts 88, 90, are installed in the battery compartment 62 by wrapping them around the top of the partition 82 as shown in FIG. 6. The contacts 88, 90 are made of a flat strip of conductive material which is bent into an undulated shape to form a resilient spring contact. Each contact 88, 90 includes a projecting tab 91 to which wires may be connected by soldering or by other known means.

In order for the sliding door 38 to be closed behind the battery 76, the battery 76 must be properly inserted, with the male and female contacts 78, 80 entering their respective slots 86, 84 and causing the spring contacts 88, 90 to retract, as shown in FIG. 5. If the battery 76 is incorrectly inserted into the battery compartment 62, as shown in FIG. 7, the terminals 78, 80 of the battery do not enter the slots 84, 86 and do not depress the contacts 88, 90. In that case, the battery does not enter the compartment far enough to close the door 38, thereby indicating that the battery has not been installed correctly. Once the battery has been installed with the correct polarity, the sliding door 38 can be slid out of its pocket 92 in the housing 10 and can close the opening 74.

In the inner surface of the battery compartment 62 adjacent the opening 74, are tracks 75 (one on each shell half 16, 18) which guide the sliding door 38 as it closes. The tracks 75 extend into the pocket 92, becoming narrower as they enter the pocket 92. The sliding door 38 has a relatively thin rail 77 along each side edge, the rails 77 being received in the tracks 75. The rails 77 are thinner than the rest of the door 38 and begin inside the outer lip 97 of the door and end inside the door's shoulder 94.

When the battery is properly installed and the door closed, the spring force provided by the contacts 88, 90 presses the battery 76 outward against the inner surface of the door 38, causing the shoulder 94 on the outer surface of the door 38 to move outward so that it contacts the edge 95 of the opening 74, causing the door to be locked in a closed position, thereby retaining the battery in the compartment. The forces exerted on the battery by the spring terminals and the door keep the battery fixed in position so that it is not free to move around in the housing as in many installations of the prior art.

The tracks 75 adjacent the opening 74 are wide enough to give the sliding door 38 two positions within the tracks—the lower position, in which the door can readily slide in and out of the compartment, and the upper position, in which the shoulder 94 contacts the edge 95 to lock the door 38 in place. In order to remove the battery, the door 38 must be pressed inward, depressing the contacts 88, 90 until the ledge 94 on the door 38 can pass under the edge 95 of the opening 74 and into the pocket 92. A raised end portion 97 of the door 38 causes the door to stop when it reaches the edge 95 of the opening 74. The raised lip 97 also gives the user something to grasp in order to pull the door 38 closed.

It will be obvious to those skilled in the art that modifications may be made to the embodiment described above without departing from the scope of the present invention.

What is claimed is:

1. A battery receptacle for a battery having first and second terminals projecting from one surface of said battery, comprising:
    a housing defining a cavity having an opening formed at one end for receiving the battery;
    first and second recesses formed at the other end of said cavity and being shaped to receive the terminals of the battery when it is inserted into the cavity;
    first and second electrically conductive springs mounted in said first and second recesses, respectively; and
    a door mounted on said housing to close said opening and to retain the battery in said cavity wherein said housing further defines a pocket adjacent the opening and wherein said pocket includes means for slidably receiving said door, so that said door is slidable between an open position in which a battery may be inserted or removed from said cavity and a closed position in which said door closes the opening to the cavity.

2. A battery receptacle as recited in claim 1, wherein said conductive springs are made of a flat strip of material bent into a convoluted shape.

3. A battery receptacle as recited in claim 1, wherein said door has an inner surface and an outer surface and defines a shoulder on its outer surface, so that, when said door is in the closed position and an outward force is applied to the door's inner surface, said shoulder extends into said opening, preventing said door from sliding open.

4. A battery receptacle as recited in claim 3, wherein said cavity is sized so that, when the battery is in said cavity, said door can slide closed only when the terminals of the battery are properly received in their respective recesses, causing said springs to be retracted.

5. A battery receptacle as recited in claim 4, wherein said housing comprises two shell halves which are fastened together.

* * * * *